May 29, 1951
E. E. METZ
2,554,584
OPTICAL REFRACTING CONTROL LENS OF
CYLINDRICAL ECHELON SHAPE
Filed Oct. 17, 1949
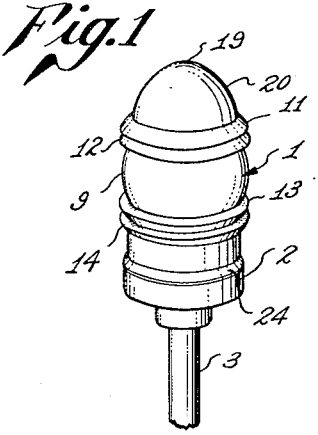
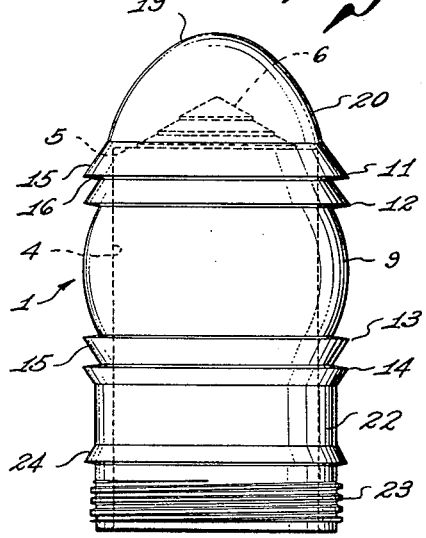
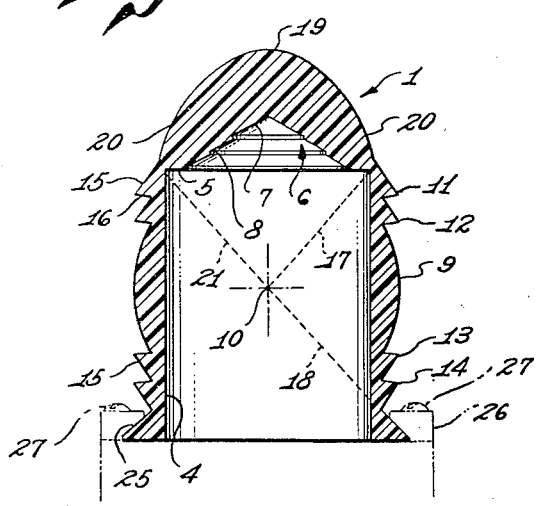
INVENTOR.
ERNEST E. METZ
BY
*Robert M. Fulwider*
Attorney Patented May 29, 1951

2,554,584

UNITED STATES PATENT OFFICE 2,554,584

OPTICAL REFRACTING CONTROL LENS OF CYLINDRICAL ECHELON SHAPE

Ernest E. Metz, North Hollywood, Calif., assignor to Ernest E. Metz and Lovey S. Metz, both of North Hollywood, Calif.

Application October 17, 1949, Serial No. 121,796

1 Claim. (Cl. 88—57)

This invention relates to optical refractors, and has particular reference to refractors or control lenses for use with light sources to control the distribution of light therefrom.

In marine navigation and more recently in air navigation, it has been common practice to use echelon or Fresnel type lenses on marker beacons, buoys, signals and the like, for concentrating in a given zone light emanating from the light source. Heretofore, such lenses have been made of glass, either clear or suitably colored, depending upon the type of service. The use of glass for such lenses, particularly in marine applications, is attended by certain disadvantages. For example, under conditions of high humidity and falling temperature, as is encountered at night near or at the sea, dew rapidly collects on the exterior surface of the lens, materially reducing the amount of light transmitted and undesirably scattering the remaining fraction of the light that actually escapes from the lens. At sea, salt spray adheres to the glass surface and upon evaporation leaves an incrustation of salt which renders the beacon or signal nearly useless.

In a few installations, it is possible to offset the loss of light transmission and control by an increase in the brilliance of the light source. In certain cases, however, such a procedure is not feasible. For example, in life saving equipment or emergency markers which must rely upon a self-contained power source and which must be visible for a number of miles to be effective, it is essential to produce the greatest and most effective light output with a minimum of energy supplied. Unless a very high efficiency and highly accurate light control are realized, the beacon or marker either fails to meet the long-distance visibility requirement or consumes power at such a rapid rate that the operating life of the limited power supply is too short to meet the requirements of the service.

The present invention is directed to an improved echelon lens which is particularly suited to marine or air navigation and safety uses, and it is an object of this invention to provide an improved echelon lens which overcomes the above noted disadvantages.

It is also an object of this invention to provide an echelon lens which is formed of a clear acrylic resin.

It is a still further object of this invention to provide an echelon lens of the character set forth in the preceding paragraphs in which the acrylic resin comprises polymethyl methacrylate.

It is an additional object of this invention to provide an echelon lens which combines a cylindrical echelon lens with a disc-type echelon lens to provide a pair of separate and distinct zones within which the light source associated with the lens displays an enhanced apparent brightness.

It is also an object of this invention to provide a lens of the character set forth in the preceding paragraphs in which said cylindrical echelon lens is arranged to concentrate light in a horizontal plane with substantially uniform azimuthal distribution, and in which said disc-type echelon lens is arranged to concentrate light in an upwardly directed cone.

It is a still further object of this invention to provide a lens of the character set forth in the preceding paragraphs which is so shaped and contoured as to reduce to a minimum the tendency of water, dust and the like to adhere to the exterior thereof.

Other objects and advantages of this invention will be apparent from a reading of the following specification, taken in connection with the accompanying drawings, wherein:

Figure 1 is a perspective view illustrating a refractor constructed in accordance with this invention and adapted for mounting upon a tubular supporting standard;

Figure 2 is a side elevational view of one embodiment of the invention; and

Figure 3 is a longitudinal sectional view of another form of the invention may take.

Referring to the drawings, there is illustrated in Figure 1 an optical refractor or control lens 1 carried by a mounting ring 2 which is in turn suitably secured upon a tubular support 3. The tubular support 3 may serve as a conduit for enclosing electrical conductors which are connected to a suitable lamp holder (not shown) mounted upon the supporting ring 2 and within the interior of the control lens 1. Such an installation is typical of many of the uses to which this invention is adapted. For example, such a mounting of the control lens 1 may be used on airport boundary markers or runway markers, or alternatively, on buoys, channel markers, and emergency signals in connection with marine navigation problems.

The control lens 1 is illustrated in detail in Figure 2, and comprises a body of transparent material which is provided with an internal bore 4. The bore 4 is preferably cylindrical and extends for substantially the full length of the refractor 1, the bore 4 terminating in a radial shoulder 5 and a conical depression indicated generally at 6. The conical depression 6 preferably comprises a series of superimposed conical surfaces 7 which are staggered relative to each other by short cylindrical sections 8.

The exterior surface of the refractor 1 resembles in appearance certain well known forms of cylindrical echelon lenses. The surface includes a central oblate spherical portion 9 which is so positoned and shaped as to provide a focal axis passing substantially through the geometric center 10 of the structure. Above and below the spherical portion 9, there are provided two pair of rib-like structures 11, 12 and 13, 14, each of these structures being defined by an inclined surface 15 and a substantially radial surface 16. The inclined surfaces 15 each comprise an appropriate extension of the spherical surface 9; that is to say, the surfaces 15 lie substantially parallel to the spherical surface 9 extended to the axial location of the surfaces 15.

The substantially radial surfaces 16 are inclined slightly with respect to a plane normal to the vertical axis passing through the center of the structure. In this way the surfaces 16 are caused to lie substantially parallel to rays of light emanating from the center 10 and being refracted upon striking the inner surface of the cylindrical bore 4. These rays are further refracted upon passing through the inclined surfaces 15 so as to leave the control lens 1 substantially parallel to horizontal planes passing through the control lens and disposed at right angles to the vertical axis thereof.

The surfaces 9 and 15 cooperate with the inner cylindrical surface 4 to direct in such horizontal planes all of the light which is emanated at the center 10 and embraced within the zone defined by the dashed lines 17 and 18 of Figure 3.

The upper surface of the control lens 1 is preferably defined by a surface which in section resembles an elliptical or paraboloidal surface. The surface is preferably characterized by relatively short radius of curvature at the apex 19 and a somewhat longer radius of curvature at the portions 20 adjacent the upper annular ring 11. This curved upper surface cooperates with the stepped cone surface 6 to direct in a generally upward direction and in conical form all of the light which emanates from a light source situated at the center 10 and embraced by the dashed lines 17 and 21 of Figure 3.

In the form of the invention which is illustrated in Figure 2, the lower part of the control lens 1 is continued downwardly as shown at 22 and formed with screw threads 23 to provide a means for securing the control lens to the mounting ring 2. Preferably, the portion 22 is provided with a shelf-like ring 24 which will overlie the mounting ring 2 and which serves to minimize the entry of water between the control lens and the mounting ring.

In the form of the invention which is shown in Figure 3, the lower portion of the control lens is formed as a tapered flange 25 which is adapted to be engaged by a clamping ring 26 secured in place as by means of screws 27, the elements 26 and 27 forming a part of the mounting means represented generally at 2 in Figure 1.

The control lens 1 is made of an acrylic resin and is preferably made of polymethyl methacrylate. This material is available under the tradename "Plexiglas." Not only are the known properties of this material (extreme transparency, high index of refraction, strength and toughness, and extremely good workability) particularly adapted to the manufacture of the control lens 1, but certain hitherto unrecognized properties of this material provide new and advantageous results which are not realized if the control lens 1 is made of more conventional materials, such as glass. It has been found, for example, on comparative tests with the same light source, that the substitution of a control lens constructed as described hereinbefore and made of polymethyl methacrylate for a similarly shaped control lens made of glass materially increases the apparent brightness of the light source when viewed from a distance. By actual comparative tests it has been found that the control lens of this invention increases the apparent brightness by more than fourfold.

Furthermore, polymethyl methacrylate has the peculiar property of completely and immediately shedding any water that may fall thereon. This is of particular advantage in marine applications where the control lens, if used on channel markers, buoys, rescue signal devices, and the like, is subjected to occasional salt sprays or an occasional complete immersion. Since the water is completely and totally shed from the device, the distribution of light is not effected by adhering water droplets as is characterized by a glass control lens, nor does the subsequent evaporation of water produce an incrustation of salt as is often encountered with glass lenses. It has also been found that under circumstances under which a glass lens will become completely covered with dew so that its optical properties are seriously impaired, the dew does not collect upon a lens constructed in accordance with this invention.

From the foregoing, it will be seen that this invention provides a new and improved optical refractor or control lens of the echelon type which exhibits numerous advantages, particularly as applied to marine and aircraft navigational installations. Attention is directed to the provision of the upper curved surface 19, 20 which acts as a disc-type echelon lens in combination with the cylindrical echelon lens defined by the surfaces 9 and 15 to simultaneously direct the light in two main zones: (a) in a horizontal plane within which the light distribution is substantially uniform in azimuth, and (b) in an upwardly directed cone making the buoy, beacon or marker particularly visible to aircraft flying overhead.

Attention is also directed to the fact that by inclining the substantially radial surfaces 16 o the lower rings 13 and 14 in an outward and downward direction, any water or dust tending to collect thereon will be shed therefrom in contradistinction to the truly radial disposition of these surfaces usually found in echelon types of lenses which tend to collect and hold any dirt, dust or water falling upon such horizontal surfaces.

While in the foregoing there has been illustrated and described the preferred embodiment of this invention, the same is not to be limited to the details shown and described except as defined in the appended claim.

I claim:

A control lens for luminous navigational aids and warning devices comprising a cylindrical echelon lens having a substantially oblate-spheroidal central portion and a plurality of axially spaced rings of substantially triangular cross-section disposed above and below said central portion, the rings below said central portion having upwardly and outwardly inclined under surfaces and outwardly and downwardly inclined upper surfaces, the lower end of said cylindrical lens being open; and a disc-type echelon lens closing the upper end of said cylindrical lens and formed integrally therewith, said disc-type lens being defined by an outer surface of approximately ellipsoidal form disposed with the portion of greatest curvature uppermost and an inner surface of offset conical form defined by a plurality of aligned frustums axially offset to form a plurality of short substantially cylindrical surfaces of different diameters extending between adjacently disposed frustums.

ERNEST E. METZ.

REFERENCES CITED

The following references are of record in the file of this patent:

UNITED STATES PATENTS

| Number | Name | Date |
|---|---|---|
| 801,766 | Churchill | Oct. 10, 1905 |
| 1,004,627 | Churchill | Oct. 3, 1911 |
| 1,483,636 | Horni | Feb. 12, 1924 |
| 1,955,599 | Lamblin et al. | Apr. 17, 1934 |
| 2,097,850 | Wallace | Nov. 2, 1937 |
| 2,314,838 | Kingston | Mar. 23, 1943 |